W. C. BAKELS.
AUTOMATIC AIR SUPPLY SYSTEM FOR AUTOMOBILES.
APPLICATION FILED DEC. 31, 1913.
1,111,556.
Patented Sept. 22, 1914.
2 SHEETS—SHEET 1.
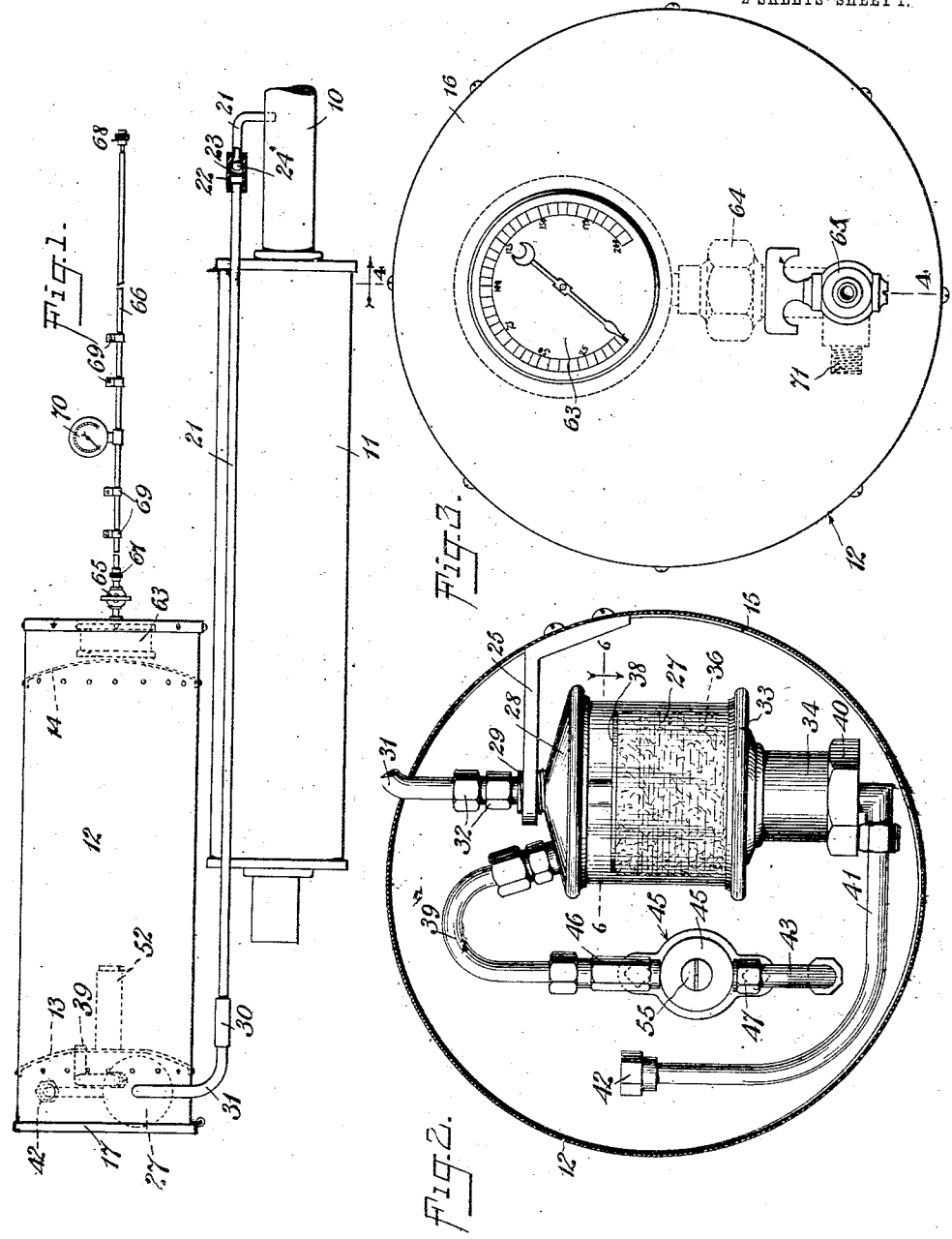
WITNESSES
INVENTOR
William C. Bakels
BY
ATTORNEYS

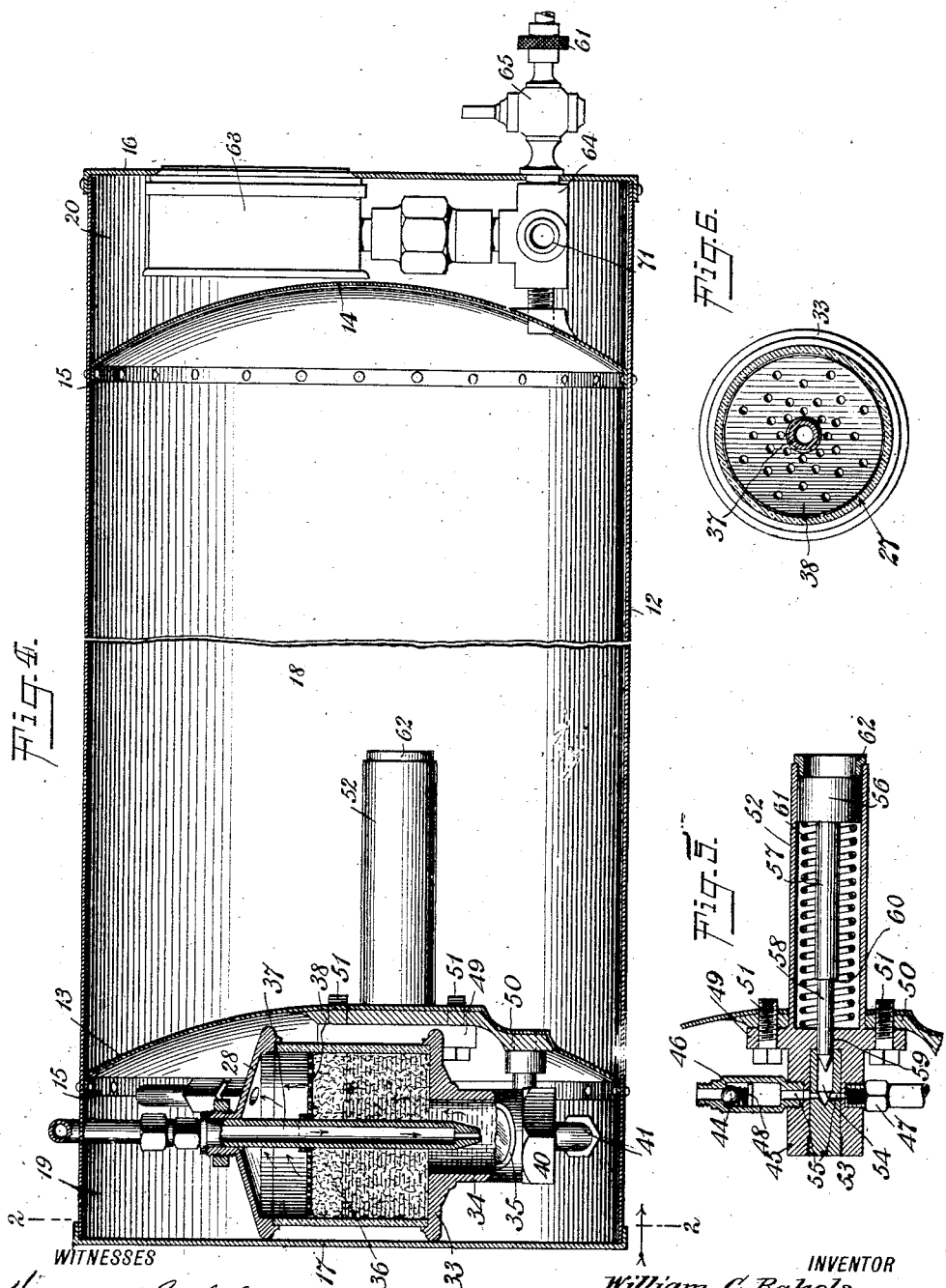

UNITED STATES PATENT OFFICE.

WILLIAM C. BAKELS, OF MIDLAND PARK, NEW JERSEY.

AUTOMATIC AIR-SUPPLY SYSTEM FOR AUTOMOBILES.

1,111,556. Specification of Letters Patent. Patented Sept. 22, 1914.

Application filed December 31, 1913. Serial No. 809,790.

*To all whom it may concern:*

Be it known that I, WILLIAM C. BAKELS, a subject of the Queen of the Netherlands, and a resident of Midland Park, in the county of Bergen and State of New Jersey, have invented a new and Improved Automatic Air-Supply System for Automobiles, of which the following is a full, clear, and exact description.

My invention has for its object the provision of an ever ready automatic air supply system for automobiles and the like, adapted to utilize the exhaust from the motor for the purpose of storing air under pressure to be utilized for the operation of the brakes, inflation of the tires or for other purposes as desired.

The invention has for a further object the provision of an air supply system of the above character, in which a storage tank is supplied with air under pressure by connection with the exhaust pipe of the motor between the engine and the muffler, there being provided means for permitting the escape of the vapors and gases and causing the same to be cleansed and purified during their passage to the storage tank, each impulse from the exhaust under great pressure causing the intermittent supply of air in the manner stated.

A still further object of the invention is to provide means for removing the products of combustion or foreign matter which may be collected in the purifying chamber or reservoir, together with means for supplying the air to the tank until the air in the tank has reached a predetermined pressure to cut off the supply, the reduction of pressure in the tank operating to move said cut-off means to permit a further supply of air to increase the pressure of the air within the tank, while connections are provided for determining the pressure of the air within the tank and for conducting the air to the air brake apparatus or to the wheels for inflating the tires thereof, as illustrated.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Figure 1 is a plan view of the apparatus used in the operation of my improved air supply system, the same being connected to the exhaust pipe of a motor between the engine and the muffler; Fig. 2 is a vertical sectional view of a storage tank taken on the line 2—2 of Fig. 4; Fig. 3 is a front elevation of the tank; Fig. 4 is a central longitudinal vertical sectional view taken on the line 4—4 of Fig. 3; Fig. 5 is a detail sectional view, showing the automatic valve for cutting off a supply of air when the pressure in the tank has reached a predetermined point and for permitting the flow thereof when the tank has been relieved or lowered by operation of the brakes or otherwise using the air; and Fig. 6 is a horizontal sectional view taken on the line 6—6 of Fig. 2.

In carrying out my improved air supply system, there is designated in Fig. 1, an exhaust pipe 10, located between the engine (not shown) and the muffler 11, which may be of any preferred type. Connected with the exhaust pipe 10, is an air storage tank 12, the same being preferably of cylindrical construction and provided with end walls and 14, preferably in the form of concavo-convex plates, having flanges 15 riveted or otherwise secured to the lateral section of the tank. One end of the tank has a permanent closure 16, while a hinged or other form of removable closure 17 is disposed at the other end of the tank, thus providing a central compartment 18 for the storage of air and end compartments 19 and 20 respectively. The connection with the exhaust pipe is made by means of a conduit 21 of rigid or flexible material adapted to resist high pressure, the same having an interposed valve casing 22 across which is provided a bar or spider 23 adapted to permit the escape of the exhausted products from the exhaust pipe therethrough, by the unseating of a check valve 24, in the present instance indicated in the form of a ball valve mounted between an end portion of a tube section of the conduit 21 and the spider. In this manner the ball is allowed to unseat under the pressure of the gases and vapors or products of combustion, due to the impulse at each exhaust of the engine, while the bar or spider prevents the valve from being so unseated that the possibility of the valve not returning to a closed position is prevented when the pressure within the casing exceeds that exteriorly of the casing, or when the engine is on its exhaust stroke, or when the controlling brakes are applied. This valve, however, as shown in Fig. 1 is not perfectly air tight, but is sufficiently loose to permit the slight escape of air, so as to relieve the air pressure within the conduit when the supply of air to the tank is cut off adjacent to the tank or when the engine stops running.

Mounted in the compartment 19, as by means of an angular bracket 25 secured to the lateral section of the tank, is a purifying chamber or reservoir 27, the same preferably consisting of a transparent lateral section, or hollow tubular body having a cap 28 with the bottom rabbeted, in which the transparent lateral section engages and also provided with an exteriorly threaded neck portion 29 which is removably secured in a threaded aperture in the free end of the bracket 25. The conduit 21, which also includes a flexible coupling or other type of connecting member 30, communicates with the interior of the purifying chamber by an inlet tube 31, which passes through the metal section of the tank communicating with the compartment 19 and which is secured to the purifying chamber through the instrumentality of binding nuts 32. This chamber is further provided with a base 33 having an internal rabbet in which the transparent lateral section of the chamber is seated, said base having a depending extension 34 of reduced diameter, which is provided at one side with a transparent cover plate 35, providing a peep opening to ascertain the height of the liquid contained in the chamber for the purpose of purifying the exhaust gases to remove all injurious matter therefrom. For this purpose a sponge or other similar porous and absorbent substance 36 is mounted in the purifying chamber around a nozzle 37 which depends centrally therethrough, the nozzle having a restricted outlet opening at its lower end, positioned within the area of the depending extension or clean-out cup 34, the sponge being saturated or the chamber containing water and alcohol through which the escaping gases are passed or submerged in rising in the chamber. The alcohol is for the purpose of preventing the water from freezing and a perforated and metallic plate 38 is fixed preferably to the nozzle 37 above the sponge or filtering and purifying medium, and while permitting the escape of the air prevents the water or solution from splashing or escaping through an outlet pipe 39, leading from the top of the chamber and coupled thereto in the same manner as the inlet tube 31. The lower end of the extension or cup 34 has a removable closure 40, while communicating with the cup through the closure is a filling tube or pipe 41, which is extended horizontally and upwardly and has a screw closure 42 on its upper end, which is removed to permit filling of the purifying chamber, but which is closed to prevent the escape of air, it being understood that the cover or closure 17 is opened for this purpose.

The outlet pipe 39 depends below the top of the purifying chamber and communicates with the interior of the tank or storage compartment 18 thereof through an inlet connection 43, while a spring check valve 44 interposed with relation to such parts for the purpose of preventing the return of air under pressure through the purifying chamber and for conserving the pressure in the storage tank in a manner to be hereinafter more fully described. Means are also provided in the form of an automatic valve, for the purpose of normally overcoming the pressure within the tank at a predetermined minimum operating pressure or low point to permit the discharge of air into the tank, until the pressure within the tank is sufficient to automatically close the valve to prevent the further discharge of air thereinto and to avoid raising pressure beyond a predetermined maximum degree. For this purpose a valve casing 45 is connected to the pipes 39 and 43 by couplings 46 and 47 respectively, the coupling 46 being provided with a valve seat at its upper end, against which the ball 44 is designed to seat upwardly, while a spider 48 is provided to permit the escape of air when the valve is open, to prevent the ball from so unseating that it will not return automatically to prevent the return of air or back pressure.

As illustrated, the valve casing is in the form of a cylindrical shell having an outer part provided with top and bottom threaded apertures receiving the couplings and a flange 49 removably secured to the end wall 13, the end wall being provided with a reinforcement 50, through which attaching screws 51 are engaged. This flange is located at the inner end of the outer part which is made considerably heavier than the inner part or barrel 52, which when the casing is secured in position, extends through an aperture in the partition wall through which the fastening screws also extend and into the compartment 18, so as to be subjected to the pressure therein. The outer part of the casing is provided with a longitudinal bore in which a bushing 53 is removably held as by means of threading the same thereinto and this bushing which is preferably of bronze or brass, is fitted against the end wall of the bore and also bored out from its inner end, as shown at 54 and is provided with a tapered valve seat at its outer end. The pipes 39 and 43 are placed in communication with each other through alined vertical passages 55 in the casing and bushing at such a point as to intercept the valve seat. A plunger 56 is removable in the inner part 52 of the casing and has a needle valve 57 extending outwardly therefrom and this valve is provided with a reduced portion 58, which is operable through an aperture 59 in the partition wall between the parts of the casing in alinement with the flange 49, said valve being preferably of bronze and having a cone-shaped valve end coöperating with the seat in the bushing to close or open the communication between the inlet and outlet pipes 39 and 43, while the shoulder 60, formed by the reduced portion with the valve proper, will serve to limit the movement of the valve to a closed position.

Normally the valve is held open and the communication established, this being effected by means of an expansible coil spring 61 contained within the casing part 52 and interposed with relation to the partition and plunger 56, so as to hold the latter inwardly displaced when the spring overcomes the pressure within the storage compartment of the tank, total displacement of the plunger and valve being prevented by means of a ring 62, removably engaged or threaded in the inner end of the casing and engaged by the plunger when inwardly displaced.

Communicating with the storage compartment of the tank through the opposite end wall 14, is a pressure gage 63 which is visible through an opening in the closure 16, the gage being thus contained in the compartment 20 and having communication with the storage compartment through pipe connections 64, for removably attaching the gage to the end wall 14. The connections 64 have a valve 65 coupled thereto through the closure 16 and a supply pipe 66 in the form of a rubber tube is removably coupled to the valve, as shown at 67 and provided at its opposite end with a coupling member 68 for communication with the inflating valves of the tires, for supplying air to the latter. The tube may be of any suitable length to reach all of the wheels of the automobile and may be supported at suitable intervals by brackets 69 with an interposed pressure gage 70, designed to advise the attendant of the pressure of the air within the tire when the valve 65 has been closed.

A lead-off 71 extends from the connections 64 and is adapted for the connection of a suitable pipe or conduit, leading to the air brake mechanism, which latter may be of any preferred type.

In the operation of the device, the tank is for example, tested to stand two hundred pounds air pressure per square inch and the gage 63 is so marked as to record the pressure in the storage compartment up to such a point. Thus upon the engine being started, the exhaust gases and air which is mixed therewith in the process of carburation will be discharged through the exhaust pipe 10 and the muffler, but a portion thereof will pass through the conduit 21, the volume depending upon the size of the conduit. The ball valve 24 will be automatically unseated and the air and gases under pressure, will pass through the inlet pipe 31 and escape through the nozzle 37 into the liquid contained in the cup 34, the valve 24 automatically closing when the pressure in the exhaust pipe is relieved. These impure gases will escape through the sponge and solution contained in the purifying chamber and will pass out through the pipe 39.

Owing to the fact that the valve 44 is normally closed contrary to the valve 57 which is held open by the spring 61 in the absence of air in the storage compartment under such pressure as to overcome the tension of the spring, the escape will then take place against the spring valve 44 and into the storage compartment through the inlet pipe 43. The spring 61 is made of such tension as to sustain one hundred and fifty pounds pressure and will therefore retain the valve 57 in an open or unseated position until the air pressure within the storage compartment is such as to overcome the same and this is preferably accomplished by a pressure of one hundred and seventy-five pounds per square inch within the storage compartment. During the time that the storage compartment is being filled or stored, the valve 44 will be automatically closed to prevent the escape of the air, but will be opened in the same manner as the valve 24 at each impulse of the exhaust, providing the same is of sufficient pressure to overcome the pressure in the conduits and compartment. When the pressure within the compartment has reached a miximum pressure, or such a pressure as to close the valve 57, further escape or discharge of the air produced by the purification of the gases, into the compartment will be prevented and by having the valve 24 loose so that it is not air tight, sufficient air will escape to permit the back flow of the air into the exhaust pipe, thus avoiding the accumulation of excess pressure in the conduits and storage compartment of the tank. By removing the purifying chamber or opening the lower end of the cup 34, all sediment and foreign matter may be removed in a convenient way. Also, upon the air in the tank being used for applying the brakes or for inflating the tires in the manner heretofore described, the valve 57 will automatically open under the action of the spring 61, as soon as the pressure within the tank has fallen to such a minimum point that the tension of the spring 61 will overcome it, but the valve 44 will automatically close to conserve the air pressure within the storage compartment of the tank should the pressure without be reduced relative thereto.

Having thus described my invention, I claim as new and desire to secure by Letters Patent:

1. An automatic air supply system for automobiles, comprising the combination with a storage tank and exhaust pipe of a motor having the usual muffler, said storage tank being connected with the exhaust pipe between the motor and the muffler, means for conveying the discharge gases from the exhaust pipe to the tank by means establishing communication between the two, and means interposed in the connection for purifying said gases during their passage to the tank, said means comprising an auxiliary tank containing a solution of water and alcohol, a porous substance saturated with said solution located hereneath, the foreign matter being retained below the porous substance and the gases escaping in the form of air.

2. An automatic air supply system for automobiles, comprising the combination with a storage tank and the exhaust pipe of a motor; of a valve connection between the exhaust pipe and the tank for conveying the discharged gases to the tank, one end of the tank having a compartment, a purifying chamber in said compartment containing a non-freezing washing solution constituting a submerged bath through which the exhaust gases are discharged downwardly to pass upwardly therethrough without displacement of the solution with the gas whereby the latter escapes in the form of air, and a valved connection between the chamber and the tank.

3. An air supply system for automobiles and the like, comprising the combination with the exhaust pipe of an engine and a storage tank for air under pressure; of a connection between the tank and the exhaust pipe through which gases escape under pressure at each exhaust of the engine, a valve interposed in the connection, means normally holding the valve open, whereby the air may be supplied to the tank, and means whereby when the pressure in the tank reaches a predetermined point, the valve will be closed until the pressure is reduced.

4. An air supply system for automobiles and the like, comprising the combination with the exhaust pipe of an engine and a storage tank for air under pressure; of a connection between the tank and the exhaust pipe through which gases escape under pressure at each exhaust of the engine, a valve interposed in the connection, means normally holding the valve open, whereby the air may be supplied to the tank, means whereby when the pressure in the tank reaches a predetermined point, the valve will be closed until the pressure is reduced, and means to prevent the return of the air from the tank to the exhaust pipe when said last-mentioned means is open.

5. An air supply system for automobiles and the like, comprising the combination with the exhaust pipe of an engine and a storage tank for air under pressure; of a connection between the tank and the exhaust pipe through which gases escape under pressure at each exhaust of the engine, a valve interposed in the connection, means normally holding the valve open, whereby the air may be supplied to the tank, said means embodying a valve subjected to the action of the air within the tank under pressure, whereby when the pressure within the tank exceeds that within the connection, the valve will be closed, and means in the connection to relieve the same of excess pressure.

6. An air supply system for automobiles and the like, comprising the combination with the exhaust pipe of an engine and a storage tank for air under pressure; of a connection between the tank and the exhaust pipe through which gases escape under pressure at each exhaust of the engine, a valve interposed in the connection, means normally holding the valve open, whereby the air may be supplied to the tank, means interposed in the connection to remove the impurities from the gases during their escape to the tank, and means whereby when the pressure in the tank reaches a predetermined point, the valve will be closed until the pressure is reduced.

7. An air supply system of the class described, comprising the combination with the exhaust pipe of an internal combustion motor and a tank; of a pipe connection between the exhaust pipe and the tank, a purifying chamber interposed in the connection and receiving the discharge of the gases therein, an absorbent element mounted in the chamber and submerged in a liquid-cleansing solution through which the gases escape in the form of air, a perforated plate fixed in the chamber above the absorbent element, and means for filling the chamber with the solution from the bottom.

8. An air supply system of the class described, comprising the combination with the exhaust pipe of an internal combustion motor and a tank; of a pipe connection between the exhaust pipe and the tank, a purifying chamber interposed in the connection and receiving the discharge of the gases therein, an absorbent element mounted in the chamber and submerged in a liquid-cleansing solution through which the gases escape in the form of air, a perforated plate fixed in the chamber above the absorbent element, means mounted in the pipe connection adjacent to the tank to prevent the return of air therefrom, and means in the connection adjacent to the exhaust pipe to permit the gradual escape of air under pressure to relieve the connection of excessive pressure.

9. An air supply system of the class described, comprising the combination with the exhaust pipe of an internal combustion motor and a tank; of a pipe connection between the exhaust pipe and the tank, a purifying chamber interposed in the connection and receiving the discharge of the gases therein, an absorbent element mounted in the chamber and submerged in a liquid-cleansing solution through which the gases escape in the form of air, a perforated plate fixed in the chamber above the absorbent element, means mounted in the pipe connection adjacent to the tank to prevent the return of air therefrom, means in the connection adjacent to the exhaust pipe to permit the gradual escape of air under pressure to relieve the connection of excessive pressure, a spring-actuated valve interposed in the connection and having a casing communicating with the pressure tank, said valve being normally retained in an open position to permit the escape of air into the tank, said valve being acted upon by the air pressure in the tank when the same reaches a maximum point, so as to close the valve, means to determine the pressure of air in the tank, and means for discharging the same therefrom.

In witness whereof I have signed my name to this specification in the presence of two subscribing witnesses.

WILLIAM C. BAKELS.

Witnesses:
 JOHN E. BURCH,
 GEORGE H. EMSLIE.